United States Patent [19]

Malek

[11] Patent Number: 4,920,567

[45] Date of Patent: Apr. 24, 1990

[54] SECURE TELEPHONE TERMINAL

[75] Inventor: Charles J. Malek, Crystal Lake, Ill.

[73] Assignee: Motorola, Inc., Schaumburg, Ill.

[21] Appl. No.: 882,652

[22] Filed: Jul. 3, 1986

[51] Int. Cl.$^5$ .................. H04M 11/00; H04L 9/00
[52] U.S. Cl. .......................... 380/33; 380/9;
  380/23; 379/95; 379/98; 379/407
[58] Field of Search ............ 455/26; 179/1.5 R, 1.5 S,
  179/2 DP; 370/94; 380/21, 23–25, 49, 6, 9, 33,
  34, 50; 379/98, 407–408, 95

[56] References Cited

U.S. PATENT DOCUMENTS

| | | | |
|---|---|---|---|
| 2,990,457 | 6/1961 | Hall et al. | 379/407 |
| 3,069,501 | 12/1962 | Gilman et al. | 379/407 |
| 3,639,690 | 2/1972 | Braun et al. | 179/1.5 R |
| 3,700,810 | 10/1972 | Richeson, Jr. et al. | 379/407 X |
| 3,769,466 | 10/1973 | Von Pfeil et al. | 379/407 X |
| 3,783,194 | 1/1974 | Vilips et al. | 379/407 |
| 3,927,265 | 12/1975 | Roedel et al. | 379/407 X |
| 3,935,403 | 1/1976 | Penicaud et al. | 379/408 |
| 3,979,559 | 9/1976 | Roedel et al. | 379/407 X |
| 4,167,700 | 9/1979 | Coe et al. | 380/49 X |
| 4,182,933 | 1/1980 | Rosenblum | 179/1.5 R |
| 4,228,321 | 10/1980 | Flanagan | 179/1.5 S |
| 4,288,664 | 9/1981 | Araseki | 379/407 |
| 4,305,152 | 12/1981 | Asakawa et al. | 455/26 |
| 4,351,984 | 9/1982 | Young et al. | 179/7 R |
| 4,368,357 | 1/1983 | Gurak | 179/1.5 R |
| 4,398,062 | 8/1983 | McRae et al. | 179/1.5 E |
| 4,411,017 | 10/1983 | Talbot | 455/26 |
| 4,419,756 | 12/1983 | Cheng-Quispe et al. | 179/2 DP |
| 4,440,976 | 4/1984 | Bocci et al. | 179/1.5 R |
| 4,549,308 | 10/1985 | Lo Pinto | 455/26 |
| 4,555,805 | 11/1985 | Talbot | 455/26 |
| 4,608,685 | 8/1986 | Jain et al. | 370/94 |
| 4,615,025 | 9/1986 | Vry | 379/407 X |

FOREIGN PATENT DOCUMENTS

0112697  7/1984  European Pat. Off. .
58-81349  5/1983  Japan .

Primary Examiner—Stephen C. Buczinski
Assistant Examiner—Bernarr Earl Gregory
Attorney, Agent, or Firm—John W. Hayes

[57] ABSTRACT

A secure Telephone Terminal apparatus and method is disclosed which permits clear analog or coded digital message signals to operate on a non-secure telephone network having conventional equipment. This Telephone Terminal is utilized as a Remote Interface at the location of each predetermined telephone subscriber authorized to receive and transmit coded message signals. Included within the Telephone Terminal is a telephone line interface, a telephone interface, a signal converting stage, and a mode selector, or controller. By utilizing a duplexer in the telephone interface and telephone line interface, the controller utilizes separate inbound and outbound signal paths to determine if a coded message signal is about to be received and switches the mode accordingly. This permits either subscriber to select the coded mode regardless of which subscriber initially set up the call. Moreover, such an arrangement is compatible for signalling between different networks, such as a radio network and a telephone network, so that mobile subscribers and telephone subscribers may exchange message signals in a secure manner.

22 Claims, 6 Drawing Sheets

SECURE TELEPHONE TERMINAL

BACKGROUND OF THE INVENTION

This invention relates to an apparatus and method for protecting privacy for message signals on a telephone network. More particularly, an improved apparatus and method is disclosed which allows message signals to be exchanged between predetermined authorized telephone subscribers. This improved apparatus and method can accommodate clear or coded message signals, such as clear analog signals or digitally encrypted coded signals, and in addition, has a signaling format which is compatible with other communication networks composed of a mixture of secure and conventional equipment so that secure, end-to-end communications are permitted to take place automatically regardless of whether the message source is a similarly equipped telephone subscriber or a subscriber on another communications network, such as a radio communications network.

The trend of today's communications systems is generally towards requiring more secure communications in order to prevent unauthorized reception and detection of certain sensitive information. Most often, such unauthorized reception and detection poses a threat to message signals on a telephone network such as the Public Switched Telephone Network. However, with the greater use of radio communication networks, there is an even greater need for protecting privacy for message signals on an integrated system, such as one containing a telephone network and a radio network. In sending sensitive information throughout such a communication system, particularly a large system such as used by a Metropolitan Police Department, it is necessary that the signal remain in a secure format while it is being passed through a large number of components. If possible, a secure signal format should be maintained while the signal is being transmitted from a mobile radio to a base station receiver serving a group of mobile radios within its coverage area, as well as through audio interconnect and patching systems such as those connecting a console unit for a radio network operator or a telephone patch providing interconnect calls to a telephone user via the Public Switched Telephone Network or PSTN. Many analog voice privacy systems have been available for some time, but offer limited security because they use frequency inversion, band splitting, and other types of analog signal scrambling techniques which are easily descrambled due to the limited number of combinations possible. It has been found that a high degree of security is obtained in a digital scrambling system where a voice information signal or clear message signal is first analog-to-digital converted in an A/D converter stage. The outputted digital signals are then encoded into a scrambled form by using shift registers and various gates to produce a pseudo-randomly encoded, or scrambled signal, hereinafter referred to as a coded message signal.

Various digital scrambling systems are available, which have limited usefulness for point-to-point, single path communications such as, for example, from a mobile radio to a mobile radio, from a mobile radio to a base station, or from a base station to another base station. These systems have no facility for multi-network interconnecting. In order for a scrambled message to be transmitted throughout a system composed of a mixture of the above networks, it is often necessary to unscramble, or decrypt, the coded message signal into the original clear message signal before again encrypting. This may provide a potential access point for an intruder into an otherwise secure communication network. Furthermore, when it is desirable to change the encryptor/decryptor code keys in such a system, it is necessary to insert the new codes at each equipment site. This is an inconvenient and time-consuming procedure.

Scramblers for radio communication networks are generally considered accessories to the units in such networks, and do not readily adapt themselves to full network operation. Moreover, portable radios have not been widely adapted for use in protected communication systems. Often times, these portable radios must be used with satellite receiver voting systems in which the best received signal is selected from a plurality of receive only sites serving a base station in a central location. Digital scrambling systems are generally not compatible with the analog voting system capabilities used in some satellite receiver systems of the known art. Many known art scrambler accessories require signal bandwidths much greater than available on the telephone network or in standard radio communication equipment. These accessories cannot be used in multi-equipment linked networks having standard bandwidths and components.

Another problem in the known art is that because digital scramblers oftentimes do not use standard channel bandwidths for transmitting signals, it is not possible to effectively intermix secure and conventional equipment associated with various single communication networks into a desired integrated system. Thus, equipment designed for voice privacy on the telephone network is often incompatible with the equipment and signaling design for radio communication networks for handling both coded and clear message signals. Known art digital scrambler systems, therefore, do not lend themselves to automatic transparent operation, that is, automatic coded/clear operation in which the message signal being transmitted is properly handled by the system components regardless of whether the message signal is in a coded or clear form. This is especially true for digital voice protected telephone networks when interfacing to a radio communication network so as to include predetermined radio subscribers, since the signalling requirements are different between the two networks.

Finally, many known art digital scramblers used in communications systems consisting of a mixture of various networks are not capable of insuring secure end-to-end communications between a subscriber on one system, such as a telephone subscriber, and that on another, such as a mobile radio subscriber. In order to protect sensitive information being exchanged between subscribers on different networks, it is desirable to have the integrated system automatically determine whether a coded or clear message signal is to be exchanged, independent of which network or which subscriber initiated the call. And yet, in order to maintain compatibility with subscribers having conventional equipment, as well as for ease of operation for those predetermined subscribers having the coded or clear message signal choice, it is desirable to have the integrated system automatically detect standard signalling (such as call progress and DTMF - dual tone multi-frequency signalling) on the telephone network.

Consequently, there exists a need for an improved secure telephone terminal, or remote interface, and method which permits coded or clear message signals to automatically exchange between telephone subscribers as well as interconnecting two other communication networks with a signaling format which permits secure, end-to-end communications to take place without intervening decryption stages. This terminal apparatus and method should be compatible with conventional equipment bandwidth and signalling constraints associated with each communication network, and further should include the capability to return to a conventional connection mode when a power failure is detected within the secure telephone terminal at the locality of a given telephone subscriber.

SUMMARY OF THE INVENTION

It is an object of the present invention to provide an improved, secure telephone terminal arrangement offering secure, end-to-end communications between one predetermined telephone subscriber and another via the Public Switched Telephone Network which overcomes the foregoing deficiencies.

It is a further object of the present invention to provide an improved, secure telephone terminal arrangement of the foregoing type which selects its receive mode automatically for handling clear or coded message signals and which has automatic signal routing based upon the characteristics of the inbound signal. As a result, a given telephone subscriber is able to exchange clear or coded message signals not only with another similarly equipped telephone subscriber, but also with a mobile radio subscriber on a linked radio network, while maintaining compatibility with the bandwidth and signalling constraints of conventional equipment on each communication network.

In practicing the invention, a secure telephone terminal arrangement is provided which permits clear or coded message signals to be exchanged via the Public Switched Telephone Network automatically. It is compatible with a similar digital encrypting format and technique known as the Motorola Digital Voice Protection method which allows a telephone communication network to be linked with a radio communication network as an integrated system for handling clear or coded message signals. This secure telephone terminal arrangement includes a telephone network interface, a telephone interface for the predetermined telephone subscriber, a signal converter having both an inbound signal path and an outbound signal path, and a controller. The telephone network interface consists of a telephone line interface having a hook switch circuit, and an audio duplexer in the form of a 2-to-4 wire hybrid. The telephone interface for the subscriber's telephone includes a line pair connected to a signal multiplexer, or MUX, which permits a normal signal route through the signal converter stages within the secure telephone terminal or a bypass path in the event of a power failure at the telephone terminal site. It also includes a 2-to-4 wire hybrid integrated circuit which provides separate inbound and outbound signal paths as well as loop current to the subscriber's telephone. The signal converter includes a 12 Kilobit half-duplex modem having quadrature amplitude modulation, a crypto stage having a separate encryptor and decryptor, a converter stage having a digital-to-analog (D/A) and an analog-to-digital (A/D) converter on the inbound and outbound signal path respectively, and two signal multiplex switches for permitting either a clear or a coded message signal path to be chosen. The controller includes peripheral stages which detect the presence of coded or clear message signals and includes a preprogrammed instruction set which is telephone subscriber accessible via a keyboard or keypad such that it coordinates the operation of the above three elements to route these message signals straight through in the clear mode and through the signal converter in the coded mode for each of the inbound and outbound signal paths. This secure telephone terminal apparatus permits voice privacy for message signals exchanging between telephone subscribers, and furthermore permits secure, end-to-end communications to take place automatically between a telephone subscriber and one or more mobile radio subscribers operating on a radio network. Of course, the apparatus of the present invention is also compatible with conventional telephone equipment. Automatic inbound coded or clear operation is permitted so that a subscriber may hear call progress or clear message signals in the event that these signals occur unexpectedly. Moreover, this secure telephone terminal arrangement will reconnect the subscriber's telephone in a bypass mode if a power failure should affect the circuitry within this secure telephone terminal apparatus.

These and other objects of the present invention will become apparent to those skilled in the art upon consideration of the accompanying specification, claims, and drawings.

BRIEF DESCRIPTION OF THE DRAWINGS

Referring to the drawings, wherein like reference numerals indicate like elements and in which.

DETAILED DESCRIPTION OF THE PREFERRED EMBODIMENT

Figure 1:
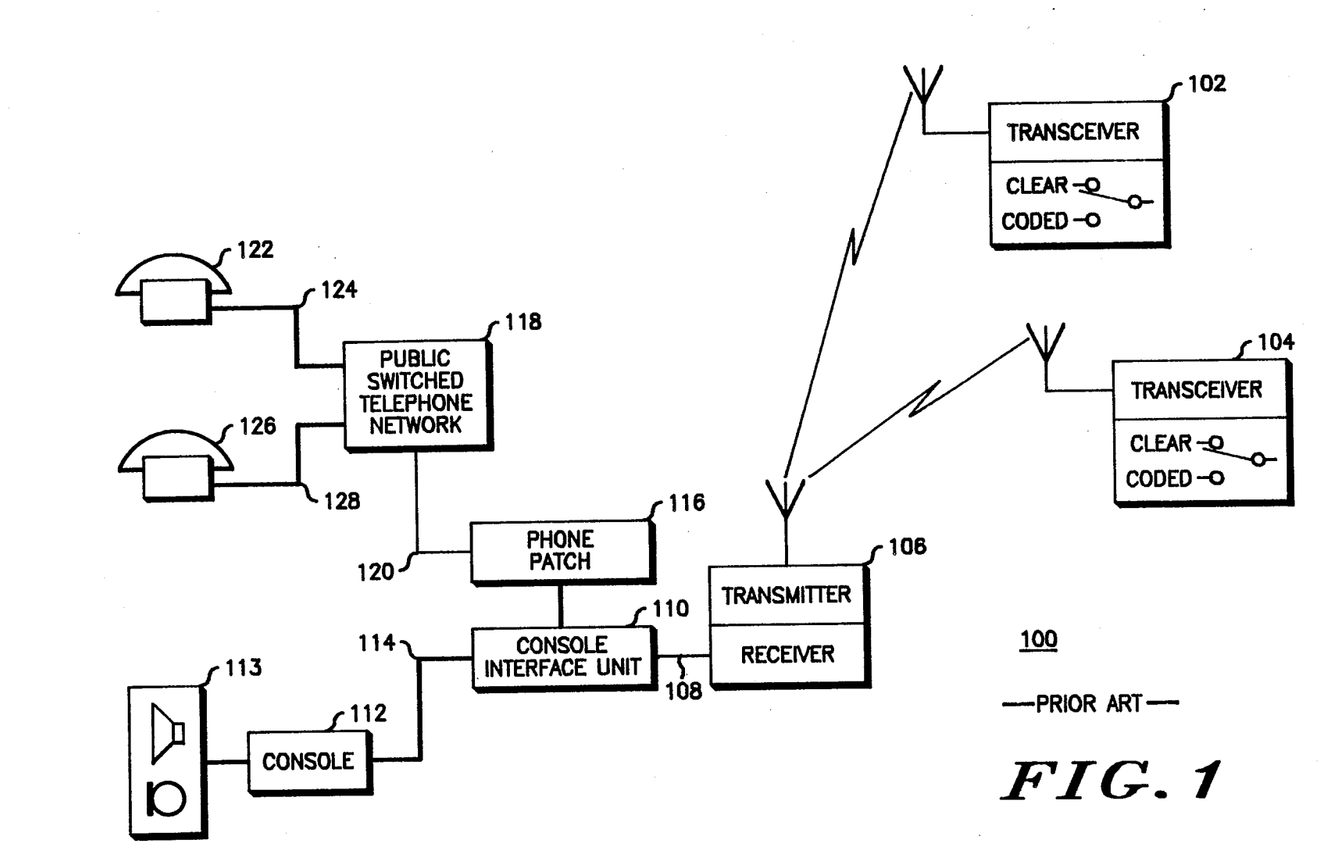
FIG. 1 is a block diagram of a prior art arrangement utilizing a phone patch for linking a secure radio communication network with a telephone network such as a Public Switched Telephone Network.

Referring to FIG. 1, there is illustrated a general communication system 100 having a radio communication network linked with a telephone network. The radio communication network as depicted includes mobile subscriber 102 having a radio receiver and transmitter (or transceiver) having a clear or coded mode of operation. Likewise, other mobile subscribers may also be operating on the radio network, with one such additional mobile subscriber 104 depicted. These mobile subscribers communicate to a base station 106, which may be a repeater controlled by a network operator. The base station 106 may be located some distance from this network operator and linked via line 108 to Console Interface Unit (CIU) 110, which is generally located in proximity to the network operator's console 112 and including microphone 113 with a push to talk switch, all of which is connected via line 114. Mobile subscriber units 102 and 104 communicate with base station 106, which routes signals via CIU 110 to the network operator at console 112, and together constitute the radio communication network having clear and coded message signal modes. Such networks are well known in the art and may include a clear or coded mode switch for the network operator at console 112, although this is not shown. This radio network may also be interfaced with the PSTN via phone patch 116, but generally such a system can only handle clear message signals over the telephone network, and thus is not considered to be truly integrated. Since coded message signals on the radio network must be decrypted or encrypted before interfacing with the PSTN, this represents a possible security breach. Phone patch 116 is interfaced with the PSTN 118 by way of telephone line 120. Telephone subscriber 122 may make or receive calls in the conventional way via the switched telephone network 118 and telephone line 124. Or, another telephone subscriber such as subscriber 126 may make or receive a call to the radio network operator via telephone line 128 and Public Switched Telephone Network 118 in the usual way.

Figure 2:
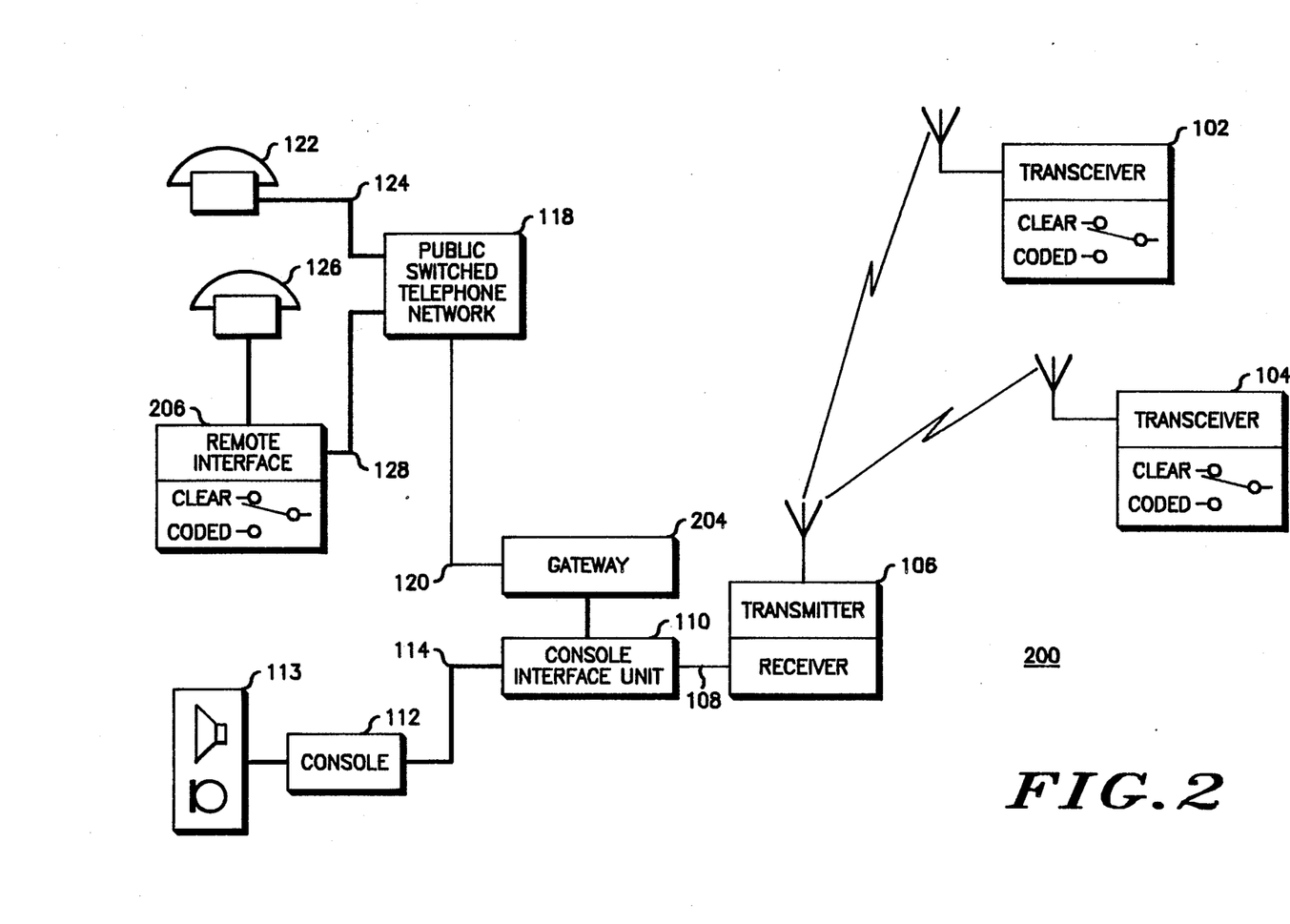
FIG. 2 is a block diagram embodying the present invention which integrates a radio communication network with a telephone network to form a secure communication system.

Referring now to FIG. 2, there is shown at 200 an secure communication system which integrates a radio communication network and a telephone network to be programmable to system needs. It is capable of automatically routing coded as well as clear message signals, such that information may be exchanged end-to-end without an intervening decryption of coded message signals. In this preferred system arrangement, the radio communication network utilizes a multi-step encoding process known as the Motorola Digital Voice Protection Method. This is a method that converts an electrical analog of a voice signal into a digital bit stream by a type of A/D conversion known as CVSD, or continuously-variable-slope delta modulation. The digital bit stream is then scrambled or encrypted by a method in which only the sender and predetermined authorized receivers are given keys. The basic concepts of this method are set forth in U.S. Pat. No. 4,167,700, which is assigned to the assignee of the present invention. This patent is incorporated here by reference as if set forth fully herein, and describes a system utilizing two-way radios which are able to listen to clear or coded message signals on its channel and which are able to respond with a clear transmission. Moreover, it is sometimes desirable in large systems to maintain different levels of security. A network operator, for example, may wish to deliver scrambled message to one user or a set of users on the radio network without communicating with another set of users on the same channel. One such method is described in U.S. Pat. No. 4,440,976 assigned to the assignee of the present invention. This patent is incorporated herein by reference as if set forth fully below. In order to implement the secure communication system depicted at 200 in FIG. 2, Gateway 204 is necessary between the radio communication network and the Public Switched Telephone Network, and Remote Interface 206 is needed at each predetermined telephone subscriber that is authorized to receive coded message signals.

Figure 3:
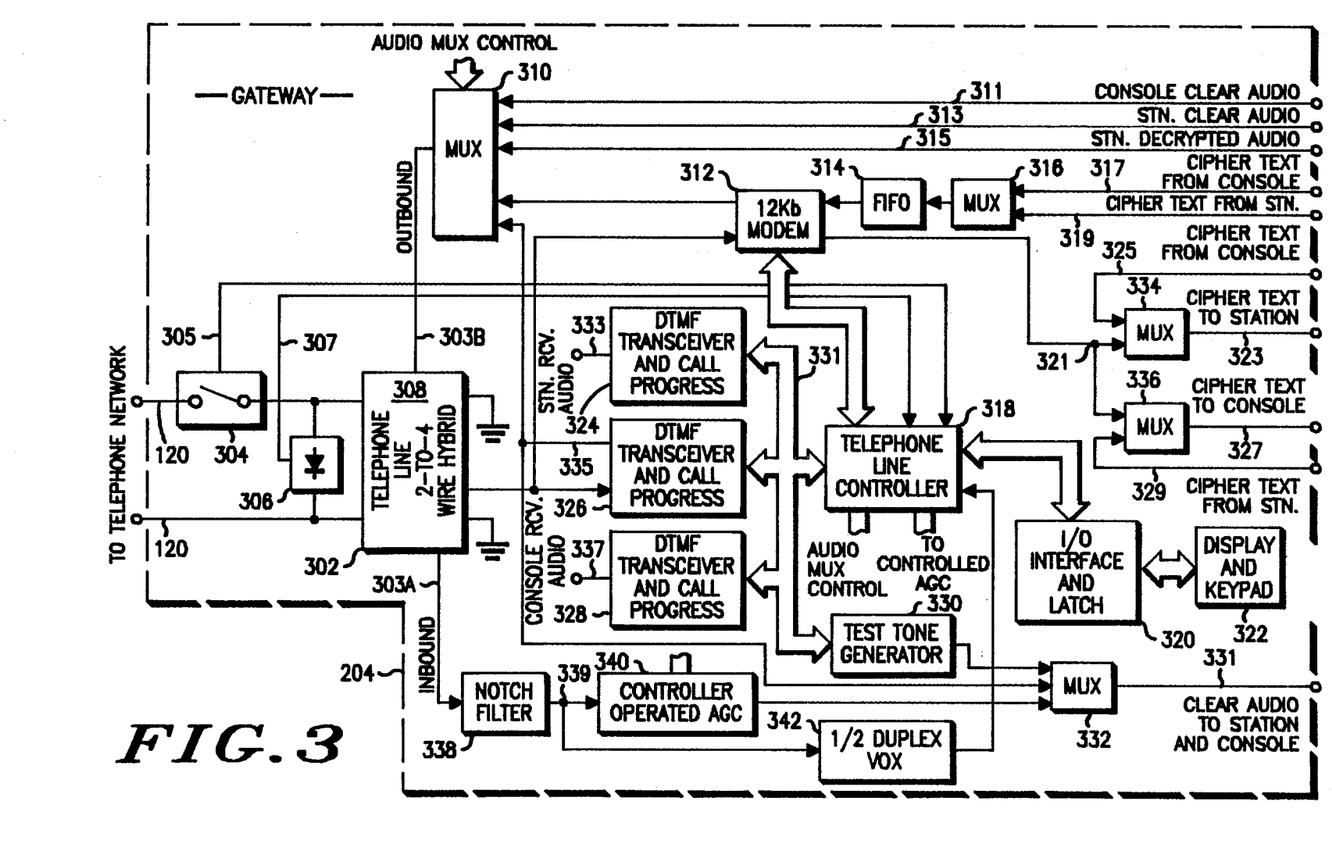
FIG. 3 is a more detailed block diagram of a Gateway device which is useful in conjunction with the present invention and which is as represented in functional form in FIG. 2.

Referring to FIG. 3, a more detailed block diagram for Gateway apparatus 204 is shown. The Gateway utilizes telephone network interface circuitry, given by 2-to-4 wire hybrid 302, to interface to the telephone network. Hybrid 302 provides separate inbound and outbound signals to the telephone network on lines 303a, and 303b. Also included are solid state hook switch 304, and ring detect circuit 306. Each of these circuits 304 and 306 is connected via respective lines 305 and 307 to the supervisory controller which will be discussed later.

The outbound signal path 303b includes multiplex switch (MUX) 310 which permits one of five different signals to be selectively chosen by a supervisory controller as the message signal on the outbound path to the telephone network. These five sources are described as shown in FIG. 3 and are derived from three inputs classified as clear audio signals, one as an analog tone signal, while two others are described as sources of coded message signals. These latter two inputs include several intervening stages before sending signals on outbound path 303b to the telephone network. More particularly, these blocks include a half duplex 12 kilobit modem 312, such as available from Motorola (UDS #2092665), a first in first out (or FIFO) buffer 314, and MUX 316. Multiplex switch 310 selects either a coded or a clear message signal source, while MUX 316 selects which of the two sources of coded message signal are routed to the telephone network.

The supervisory controller consists of a group of functional blocks beginning with Telephone Line Controller 318, interface stage 320, and display with keypad 322. This Telephone Line Controller 318 is also connected to a number of DTMF tone generators and receivers, one for each of the possible message signal sources, including DTMF transceiver 324 for the RF station, DTMF transceiver 326 for the telephone network, and DTMF transceiver 328 for the console. And while the clear audio output consists of a single line, 331, the coded message signal path through the Gateway device is more complex.

The inbound signal path 303a may have a coded message signal from the telephone network which proceeds into the Gateway to half duplex modem 312 which is normally in the receive mode and which outputs a bit stream on line 321. From this line, the bit stream is routed to MUX 334 and MUX 336 for eventual routing to the station or to the console, respectively. The bit stream or ciphered text available on line 321 is then routed to the station via line 323 under control of MUX 334. The other source of ciphered text that may be routed to the station is from the console via line 325. Similarly, MUX 336 is able to route ciphered text to the console via line 327 which may be sourced from either the telephone network via line 321 or from the station via line 329. As a result, it should be obvious that lines 323, 325, 327, and 329 constitute the ciphered text interconnections between the Gateway and the Console Interface Unit, CIU. Line 331 constitutes the clear audio path between the Gateway and the CIU. Because of special control signaling utilized by the Gateway, the clear audio path preceding line 331 must include a notch filter 338. This notch filter has a center frequency of approximately 300 Hz, which is the approximate frequency of a connect tone to be described in more detail later. The output of notch filter 338 represents a filtered signal that has the connect tone removed so as to provide a filtered signal at point 339 which is essentially the desired clear audio. Moreover, because the telephone network exhibits highly-variable characteristics which are dependent on distance and line characteristics, a controller-operated AGC stage 340 was needed to provide a consistent audio level which then could be interfaced with the radio communication network. The output of the controller-operated AGC 340 is connected to MUX 332, as shown in FIG. 3. Again, it is important to note that MUX 332, 334, and 336 are all under control of Telephone Line Controller 318. The filtered signal at point 339 is also utilized to drive half duplex VOX circuit 342 which permits the telephone line controller 318 to sense when the telephone subscriber begins talking. This VOX circuit is used for the clear mode only, to allow the telephone subscriber to switch the repeater from the receive mode to the transmit mode. Telephone Line Controller 318 also supervises telephone line 120 and automatically connects to the telephone network by utilizing ring detect circuit 306 and hook switch circuit 304. These two circuits permit the Gateway to detect a ringing signal and then answer by permitting loop current to flow. In this manner the Gateway acknowledges that it is being called by a telephone subscriber. Moreover, DTMF transceiver and call progress tone device 326 has its input connected to inbound signal path 303a and can therefore detect various call progress tones, such as line busy or line dropped, as they occur. And when initiating a call to the telephone network, Telephone Line Controller 318 is able to utilize DTMF transceiver and call progress device 326 to generate the desired telephone subscriber's number in tone format, directing it through MUX 310 to the outbound signal path 303b, and ultimately to the telephone network.

Figure 4:
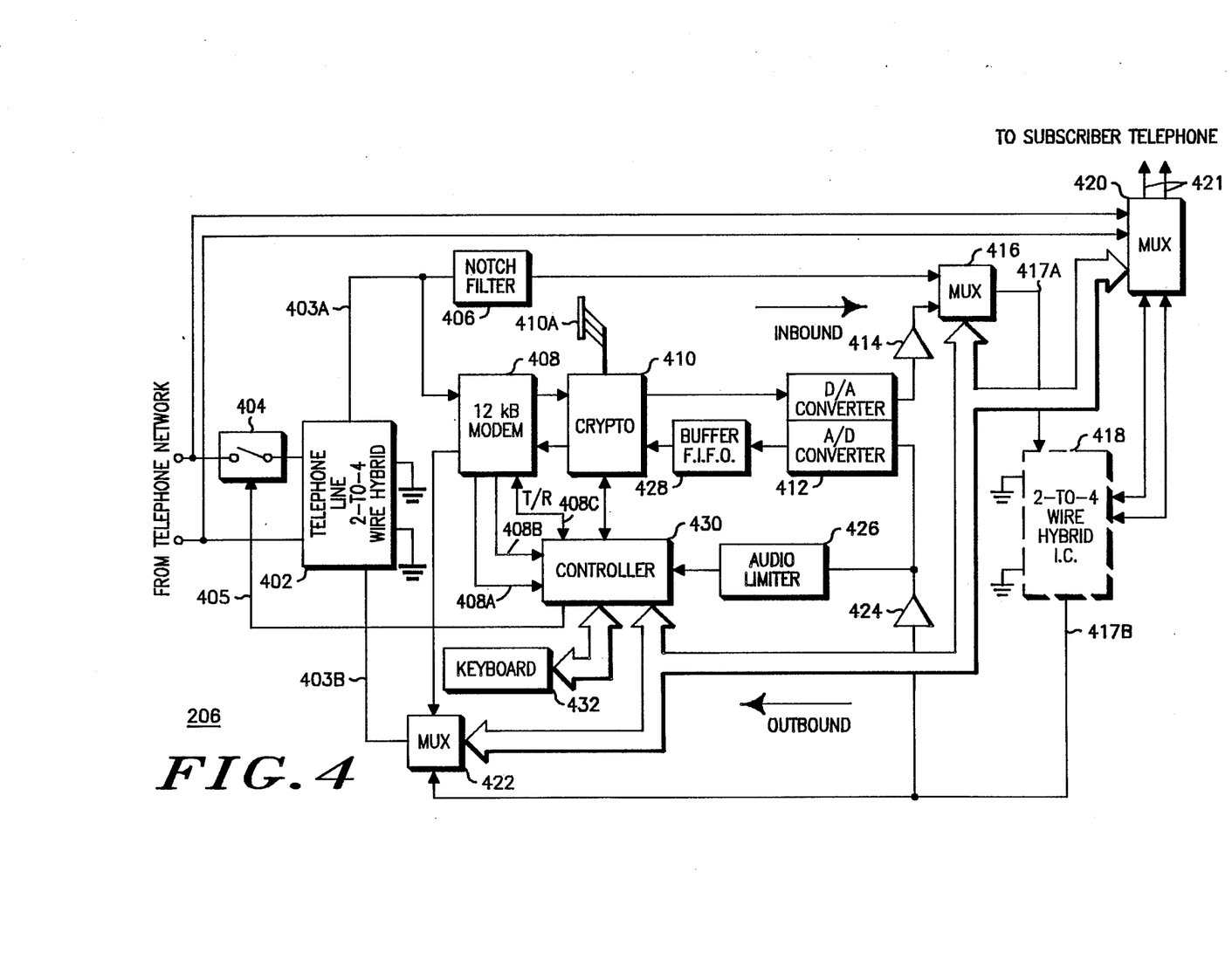
FIG. 4 is a more detailed block diagram of the Remote Interface, or telephone terminal, of the present invention as represented in functional form in FIG. 2.

Referring to FIG. 4, the Remote Interface 206 which interfaces a subscriber telephone to the telephone network is shown. This device is somewhat similar to the Gateway in that it utilizes separate inbound and outbound signal paths and a controller coordinating the signal routing and operation of a half duplex modem. However, the Remote Interface also includes encryption and decryption stages and a "deadman" circuit which bypasses the Remote Interface circuitry altogether upon detecting a power failure. Beginning at the telephone line hybrid 402 is shown which provides the separate inbound and outbound signal paths 403a and 403b, respectively, from the single telephone line. Also included is hook switch circuit 404 which has a connection line 405 to the controller that will be discussed shortly. The inbound signal path 403a splits into two paths, one of which is the clear message signal path through notch filter 406. The other path proceeds to half duplex modem 408 which outputs a signal to crypto stage 410. A key loader interface plug 410a like that incorporated on a DVP equipped subscriber radio is included at this stage for programming a new key number into storage registers for encrypting as well as decrypting in crypto stage 410. The output of the decrypting stages within crypto stage 410 proceeds to conversion stage 412 which includes a digital to analog converter whose output feeds buffer stage 414. The output signal from buffer stage 414, as well as the clear signal available from stage 406, are connected to MUX 416 which is operated by the controller to provide an output signal 417a. This signal is directed through 2-to-4 wire hybrid integrated circuit 418 which provides an output to multiplex switch 420 which has a second input via lines 419 from the telephone network to provide a bypass as well as straight-through path through the Remote Interface for the telephone subscriber. The subscriber's telephone interconnects with the Remote Interface 206 by means of lines 421. When the telephone subscriber speaks, his message signal proceeds via lines 421 through MUX 420 to block 418 which provides a separate transmit path via line 417b to become the outbound signal on the telephone line. His message signal, which is analog voice, proceeds to MUX 422 as well as buffer stage 424. The output from stage 424 is then converted into a digital signal by means of an A/D converter stage within conversion stage 412, and is applied to audio limiter 426. The output from A/D stage 412 connects to FIFO buffer stage 428. The FIFO permits voice-operated-transmit (VOX) operation, rather than push-to-talk (PTT) operation, with negligible loss of the beginning of a message signal by storing the clear message signal or plain text from the A/D converter within conversion stage 412 during the modem's "fast" train. The output signal from buffer stage 428 is then encrypted within block 410 and then reformatted into quadrature amplitude modulated signals in stage 408. This reformatted signal is applied to a second input of MUX 422 which selects the coded or clear message signal to be sent on outbound signal path 403b as determined by controller 430. Controller 430 supervises the activity of signals inputted to modem 408 via a carrier detect 408A and energy detect 408B pair of lines, and controls the transmit or receive mode of modem 408 by a direct control line 408C. Controller 430 is also subscriber programmable by means of keypad and indicator block 432.

With these assumptions in mind, when a telephone subscriber initiates a call with the intention of sending a message signal in clear text mode, the telephone subscriber dials the Gateway's telephone number. The Gateway answers after a programmable number of rings and establishes the connection to the radio network. In the event that a radio subscriber replies in ciphered text as opposed to clear text, any other radio subscribers operating on the same key as well as the console operator will be able to decrypt and understand the message signal. The telephone subscriber, however, will hear a low-level ciphered text coded message signal. This message signal is discernible to the telephone subscriber only as noise. If the radio subscriber has replied in clear mode, the clear message signal will be passed between the telephone subscriber and the radio subscriber in the usual way. In any event, the Gateway will disconnect when either the telephone subscriber goes on hook, or the Gateway receives a DTMF disconnect tone sequence.

Next, if a radio subscriber initiates a call in clear text mode by keying up in clear with the Gateway access DTMF sequence, the Gateway will respond with dial tone. The radio subscriber may then directly dial the number to be called, or access a speed-dialing menu. The programming within the controller 318 could terminate the call attempt if three busy call progress tones are detected, for example. Otherwise, the call proceeds as in the previous paragraph.

If ciphered text operation is desired, a telephone subscriber dials the Gateway number as before. The Gateway answers after a programmed number of rings and establishes the connection to the radio system. Upon selecting the ciphered text mode, the telephone subscriber initiates a "long" train signal. The "long" train is employed only at the initial call setup. Its purpose is to adjust an adaptive equalizer within the modem to the specific line conditions for this call. An additional purpose is to knock down the echo cancellers in the PSTN to permit passage of high speed digital data. In the preferred embodiment the "long" train requires approximately 4 seconds in each direction. The Gateway then replies upon completion with its long train. Both the console operator and the radio subscribers will hear a low-level "modem progress tone" during the interval when these two long trains take place. This time interval is approximately seven to eight seconds, and because this modem progress tone is at the lowest priority level for PTT access, it may be preempted by anyone's PTT transmission. A high priority level "train complete tone" advises all concerned on the secure communication system that the cipher patch is complete. A 300 Hz signal is utilized as the connect tone to keep the echo cancellers inactive while in this mode. Thereafter, all predetermined authorized radio subscribers must select the cipher text mode in order to communicate with the telephone subscriber who is operating in the ciphered text mode. Coded message signals may therefore be exchanged back and forth in the normal way. If a telephone subscriber's cipher text mode transmission is interrupted by a higher priority PTT, the higher priority is immediately heard over the air, but the Gateway delays transmitting on the telephone line until a drop in modem carrier detect is heard. This enables the telephone subscriber's Remote Interface to always receive the "fast" train. Termination of the call is by timeout timer, a knock down DTMF sequence, or call progress tones, such as line dropped or dial tone. For security reasons, a reverting back to clear mode is not possible at this point, which would constitute a mixed mode of operation. It is also important to know that if a telephone subscriber accidentally hits the switch from coded to clear while in the ciphered text mode during communication with the Gateway, he will be heard by the console operator or radio subscriber community. However, if a radio subscriber changes to the clear mode after a subscriber has set up the Gateway in coded mode, the radio subscriber will not be heard by the telephone subscriber. The ability of this system to remain in a coded mode of operation is desirable for system security reasons so that a Gateway signal bound for the telephone network will not inadvertently be decrypted by operator error.

Figure 5:
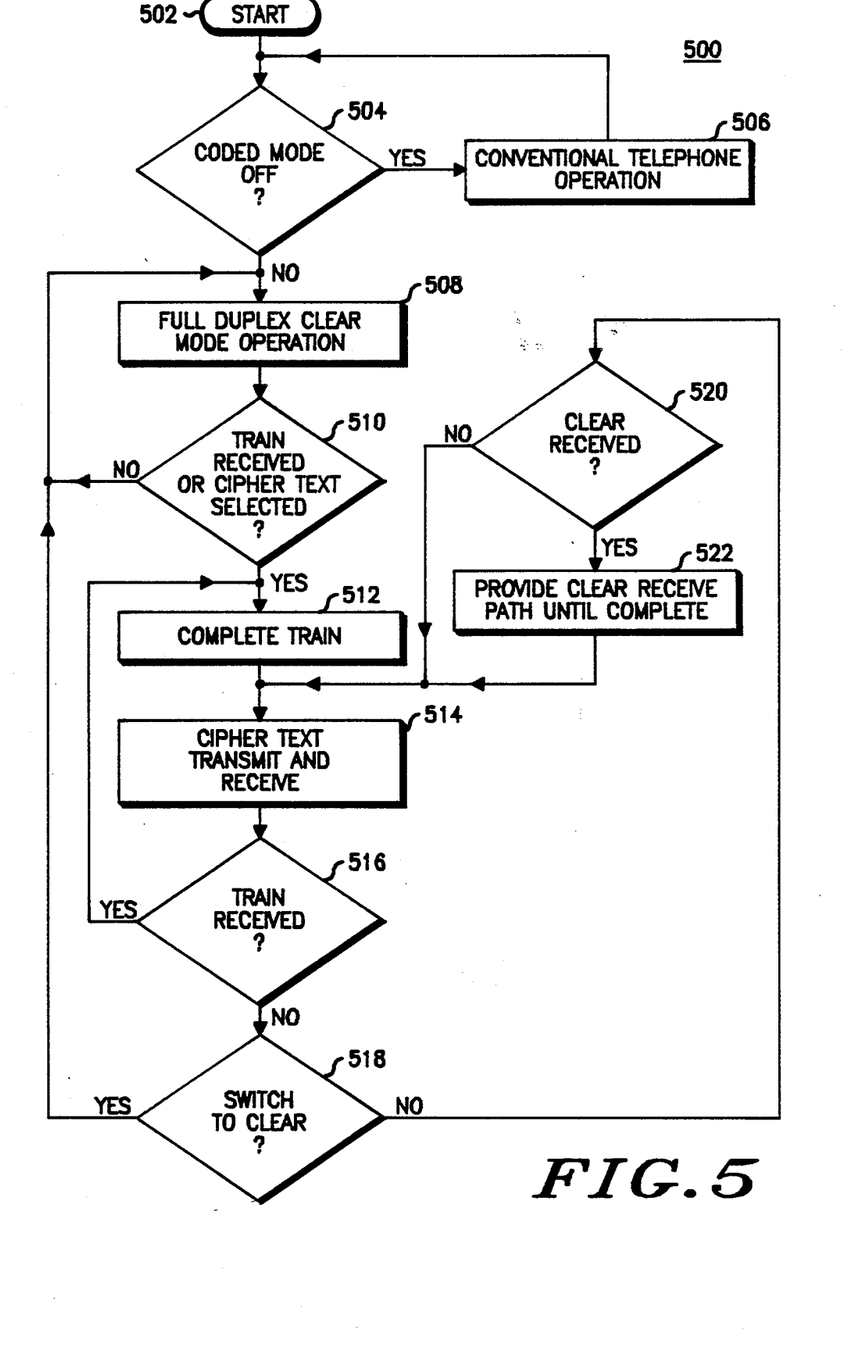
FIGS. 5 constitutes a flowchart used by the controller within the Remote Interface, or telephone terminal, of FIG. 4.

Turning now to FIG. 5, the flowchart for the telephone terminal, or Remote Interface, depicts the various modes of operation and the conditions which must be detected or met before changing from one mode to another. Beginning at the starting point 502, the Telephone Terminal idles in a standby mode in which it checks for incoming calls of either a clear or coded message signal format. Next, in block 504, it checks to see whether the coded mode is OFF. If the answer is YES, the Telephone Terminal operates in a conventional telephone operation mode as given by block 506 which provides an open path for clear mode communication. It then proceeds back to block 504 to check whether the coded mode is still OFF. If the answer is NO, the controller proceeds to block 508 which permits full-duplex clear mode operation. It next checks in block 510 to see whether the long train was received or ciphered text was selected. If the answer is NO, the controller proceeds back to block 508 and continues full-duplex clear mode operation. If the answer to block 510 is YES, the controller proceeds to block 512 which permits the complete train sequence to be accomplished. That is, if the long train was received and noted in block 510, then the telephone terminal replies with its own long train. On the other hand, if the telephone subscriber was the person initially selecting the ciphered text mode as detected in block 510, then the controller within the telephone terminal initiates the long train and awaits the reply from the called subscriber equipment according to block 512. With the step according to block 512 accomplished, the controller next permits ciphered text, or coded message signals to be transmitted and received according to block 514. It next checks in block 516 to see whether the fast train was received. If the answer is YES, it proceeds back to block 512 as shown. If however the answer to block 516 is NO, the controller proceeds to check via block 518 whether to switch to clear. If the answer is YES, the controller proceeds back to block 508 as shown. If the answer to block 518 is NO, the controller proceeds to block 520 in which it checks to see whether a clear mode signal is received. If the answer is NO, the controller proceeds to block 514 and continues in the ciphered text transmit and receive mode, also known as the coded message signal mode. If the answer to block 520 is YES, the controller proceeds to block 522 in which it provides a clear receive path until the fast train is complete. The controller then resumes normal flow by returning to block 514 as shown.

Figure 6:
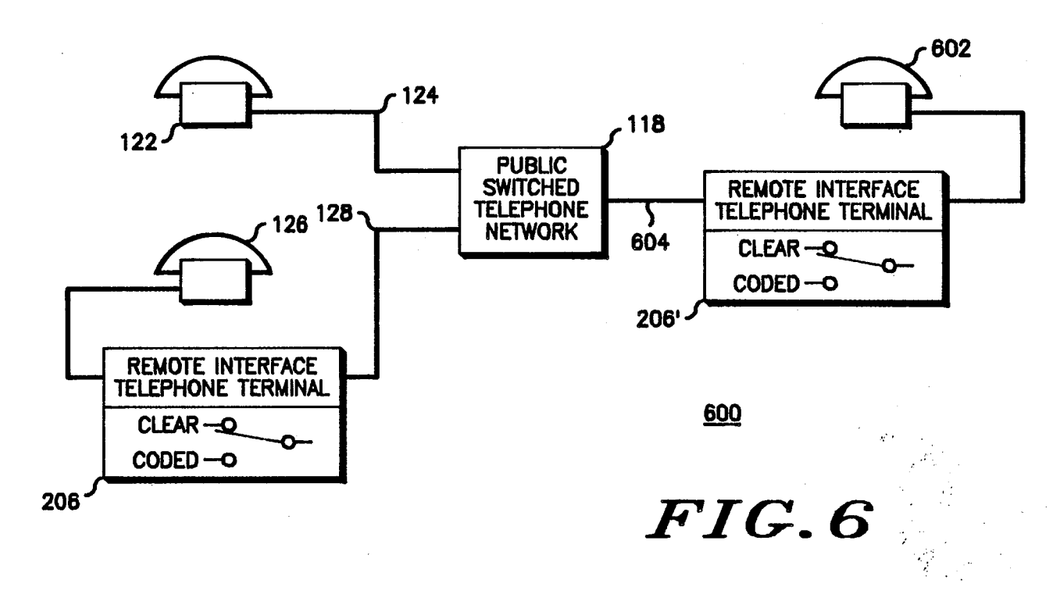
FIG. 6 is a block diagram of an alternate system having the advantages of the present invention which depicts multiple telephone subscribers equipped with secure telephone terminals and linked by the Public Switched Telephone Network.

FIG. 6 depicts an alternate embodiment of the present invention, showing a secure communication system consisting of at least two telephone subscribers having a remote interface or telephone terminal linked via the Public Switched Telephone Network as shown. A first telephone subscriber having a conventional telephone 122 is shown connecting to the Public Switched Telephone Network 118 via line 124. Another telephone subscriber having a conventional telephone 126 linked to the telephone network via line 128 is shown with a clear or coded mode of operation by means of Remote Interface or Telephone Terminal 206. Still another telephone subscriber having conventional telephone 602 linked to the telephone network via line 604 is shown with a similar Remote Interface or Telephone Terminal 206'. In this system any one of the telephone subscribers may initiate to call in clear to any other of the telephone subscribers. However, only telephone subscriber 126 and 602 may utilize the advantages of the present invention by selecting the coded mode of operation with their respective telephone terminals. And, although one telephone subscriber may initiate the call, such as telephone subscriber 126, either of the subscribers may subsequently select the coded mode of operation. Thus, if telephone subscriber 602 is the called party and he selects the coded mode for ciphered text operation first, the telephone terminal 206 for subscriber 126 will automatically switch the mode from clear to coded mode of operation. This capability comes about by the fact that separate inbound and outbound signal paths are used within the Remote Interface or Telephone Terminal for each telephone subscriber, and the controller automatically routes the message signal along the appropriate path within the Remote Interface or Telephone Terminal based upon the modem's energy detect and modem carrier detect signals. Hence the system depicted at 600 in FIG. 6 operates much the same way as the system of FIG. 2, permitting any subscriber to call another subscriber and conduct an exchange of message signals in either clear or coded mode automatically.

In summary, each of the above mentioned arrangements is able to accomplish secure end-to-end communications between subscribers operating on different, but linked communication networks. Each subscriber is able to initiate a call in clear mode, and then has the choice of continuing the call in clear mode or selecting a coded message signal mode in which only predetermined authorized subscribers are able to participate. Moreover, only one such subscriber needs to select the coded message signal mode while all of the intended listeners' equipment will automatically follow. Thus, each of these arrangements utilizing the apparatus and method of the present invention is able to overcome the limitations of the known art.

Although these arrangements of the present invention fully disclose many of the attendant advantages, it is understood that various changes and modifications not depicted herein are apparent to those skilled in the art. Therefore, even though the form of the above-described invention is merely a preferred or exemplary embodiment given with a suggested alternative, further variations may be made in the form, construction, and arrangement of the parts without departing from the scope of the above invention.

I claim:

1. A secure communications system for a plurality of predetermined subscribers, each accessible on a conventional telephone via the telephone network, such that clear analog or encrypted digital message signals may be exchanged end-to-end automatically, the system comprising:
   a telephone network having a plurality of predetermined subscribers;
   at least two remote interface means, one co-located at each predetermined subscriber's conventional telephone, each including:
   (a) signal converting means, including at least a half-duplex modem having a signalling format compatible with other systems, for accommodating clear or encrypted message signals; and
   (b) mode selecting means, responsive to said half-duplex modem based upon characteristics of a received inbound message signal applied thereto as well as responsive to a desired mode by the predetermined subscriber, for automatically selecting a clear or encrypted mode in said signal converting means, and switching to the encrypted mode upon receipt of a first train which disables echo cancellers on the telephone network and which adjusts adaptive equalizers in the modem to permit passage of high-speed digital data in the encrypted mode, and a second train preceding each transmission of an encrypted message signal, so that secure, end-to-end communications take place automatically over said telephone network.

2. The secure communications system according to claim 1, wherein said first train includes a long train sequence having an echo suppression tone, an alternations tone for carrier sync and baud timing, and an equalizer conditioning tone.

3. The secure communications system according to claim 2, wherein said echo suppression tone is approximately 2150 Hz, said alternations tone lasts about 2 seconds, and said equalizer conditioning tone lasts about 1.25 seconds.

4. The secure communications system according to claim 1, wherein said second train includes a fast train sequence having an alternations tone for carrier sync and baud timing, followed by a carrier tone.

5. The secure communications system according to claim 4, wherein said alternations tone lasts approximately 24 milliseconds, and said carrier tone lasts about 11 milliseconds.

6. The secure communications system according to claim 1, wherein said characteristics of the message signal includes energy and carrier as detected therein on said inbound signal path.

7. The secure communications system according to claim 1, wherein said remote interface means further comprises telephone network interface means including an audio duplexer, such as a 2-to-4 wire hybrid transformer, for providing separate inbound and outbound signal paths to permit two split paths for clear and for encrypted message signals on said inbound signal path, as well as a hook-switch circuit and a ring detect circuit.

8. The secure communications system according to claim 1, wherein said remote interface means further comprises telephone interface means including a 2-to-4 wire hybrid semiconductive circuit, such as an MC-3419, which also provides loop current to the subscriber telephone.

9. The secure communications system according to claim 1, wherein said signal converting means in the first mode comprises:
   (a.) an inbound signal path including:
      (i.) a clear analog path having a low frequency notch filter and a first controllable multiplex switch;
      (ii.) a half-duplex modem for monitoring signals inputted to said low frequency notch filter; and
   (b.) an outbound signal path including:
      (i.) a clear analog path having a second controllable multiplex switch.

10. The secure communications system according to claim 1, wherein said signal converting means in the encrypted mode comprises:
    (a.) An inbound signal path including:
       (i.) a half-duplex modem for recovering cipher text from the encrypted digital signal;
       (ii.) a decryptor for recovering plain text from the cipher text from said modem;
       (iii.) a D/A converter stage for recovering an analog signal from the plain text from said decryptor;
    (b.) An outbound signal path including:
       (i.) an A/D converter stage;
       (ii.) a FIFO buffer, coupled to the output from said A/D converter stage, for permitting VOX operation with negligible loss of a message signal by storing the message signal from said A/D converter during the second train;
       (iii.) an encryptor, coupled to said FIFO buffer, for converting the plain text from said A/D converter stage into cipher text; and
       (iv.) a half-duplex modem, coupled to said encryptor, for converting the cipher text into an outbound encrypted digital signal.

11. The secure communications system according to claim 10, wherein said half-duplex modem includes a modulator/demodulator having a quadrature amplitude modulated signal format quantized at 5 bits per baud with a data rate such as 12 kilobits per second and outputs carrier detect and energy detect signals.

12. The secure communications system according to claim 1, wherein said mode selecting means comprises:
   a notch filter having a center frequency at approximately 300 Hz;
   a keypad with indicators having an I/O interface with latch;
   a FIFO buffer; and
   a microcontroller, such as an 68HC11 microprocessor, having an audio limiter as an A/D converter for providing a VOX circuit, said circuit automatically switching the half-duplex modem from receive to transmit mode when the telephone subscriber begins talking, and said FIFO buffer temporarily storing the encrypted message signal during the modem's fast train so as to minimize the loss of the encrypted message signal.

13. The secure communications system according to claim 1, wherein said mode selecting means is remotely operable by another predetermined subscriber via the carrier detect and energy detect signals from said half-duplex modem and which is locally operable by said telephone subscriber.

14. The secure communications system according to claim 13, wherein said mode selecting means remotely operable by another predetermined subscriber includes a subscriber on a radio network having a gateway, or a subscriber on a telephone network.

15. The secure communications system according to claim 1, wherein said mode selecting means includes a bypass, straight-through mode in the event of power failure.

16. In a telephone network having a plurality of telephone subscribers utilizing conventional equipment, an improved method for handling message signals alternately in a clear or encrypted mode between at least one predetermined telephone subscriber and another predetermined subscriber such that secure end-to-end communications take place automatically, the method comprising the steps of:
   establishing a telephone call by:
      initiating setup in the clear mode by a subscriber;
      continuously monitoring for a subscriber's request to switch to the encrypted mode while in the clear mode, and then responding to the request by exchanging long train signals which disable echo cancellers on the telephone network and which adjust adaptive equalizers to permit passage of high-speed digital data in the encrypted mode;
   terminating a telephone call by:
      detecting a knockdown command such as a manual or automatic command regardless of the present mode of the telephone call.

17. The method according to claim 16, wherein said step of initiating call setup includes call initiation by a mobile subscriber or a telephone subscriber.

18. The method according to claim 16, wherein said step of continuously monitoring for a request to switch to encrypted mode includes monitoring for a control tone of approximately 2150 Hz, followed by fast train and a connect tone of approximately 300 Hz at the remote interface so as to respond to a request originating from another predetermined subscriber, such as a telephone subscriber or a mobile subscriber on a radio network having a gateway.

19. The method according to claim 16, wherein said step of continuously monitoring for and responding to a request to switch to the encrypted mode includes initiating a control tone of approximately 2150 Hz followed by fast train and a connect tone of approximately 300 Hz in response to the predetermined telephone subscriber's request, thereby effecting automatic switching to the encrypted mode.

20. The method according to claim 16, wherein said step of terminating a telephone call includes detecting a manual knockdown command, such as the predetermined telephone subscriber going on hook, or an automatic knockdown command, such as call progress tones initiated by another predetermined subscriber.

21. Remote interface apparatus for adapting a conventional telephone to handle clear analog or encrypted digital message signals automatically in a first or second mode via the telephone network and responsive to a first and second train, the apparatus comprising:
   (a) signal converting means, including at least a half-duplex modem having a signalling format compatible with other systems, for accommodating clear or encrypted message signals; and
   (b) mode selecting means, responsive to said half-duplex modem based upon characteristics of a received inbound message signal applied thereto as well as responsive to a desired mode by the predetermined subscriber, for automatically selecting a clear or encrypted mode in said signal converting means, and switching to the encrypted mode upon receipt of a first train which disables echo cancellers on the telephone network and which adjusts adaptive equalizers to permit passage of high-speed digital data in the encrypted mode, and a second train preceding each transmission of a encrypted message signal, so that secure, end-to-end communications take place automatically over the telephone network.

22. The remote interface apparatus according to claim 21, wherein said
   (a) signal converting means includes a half-duplex modem coupled to a crypto stage, a FIFO buffer, and a conversion stage for receiving encrypted message signals, and includes a notch filter for receiving clear message signals;
   (b) mode selecting means includes a controller coupled to a first and second multiplex switch for automatically routing clear or encrypted message signals in the first or second modes; and wherein the remote interface apparatus further comprises:
   (c) telephone line interface means including an audio duplexer and a hook switch circuit for coupling to said telephone network, and telephone interface means including a 2-to-4 wire hybrid semiconductive circuit for coupling to the conventional telephone, for providing separate inbound and outbound signalling paths.

* * * * *